(12) United States Patent
Zeiher et al.

(10) Patent No.: US 7,243,885 B2
(45) Date of Patent: Jul. 17, 2007

(54) POSITIONING DEVICE FOR ADJUSTABLE HOUSING

(75) Inventors: Juergen Zeiher, Stuttgart (DE); Thomas Klaas, Asperg (DE); Sabine Koerber, Ludwigsburg (DE); Andreas Reichert, Oberstenfeld (DE)

(73) Assignee: Robert Bosch GmbH, Stuttgart (DE)

( * ) Notice: Subject to any disclaimer, the term of this patent is extended or adjusted under 35 U.S.C. 154(b) by 338 days.

(21) Appl. No.: 10/250,662

(22) PCT Filed: Sep. 18, 2002

(86) PCT No.: PCT/DE02/03490

§ 371 (c)(1),
(2), (4) Date: Jul. 8, 2004

(87) PCT Pub. No.: WO03/039917

PCT Pub. Date: May 15, 2003

(65) Prior Publication Data

US 2004/0239574 A1   Dec. 2, 2004

(30) Foreign Application Priority Data

Nov. 2, 2001   (DE) .................................. 101 54 080

(51) Int. Cl.
*F16M 11/24* (2006.01)
(52) U.S. Cl. ................................................. 248/188.2
(58) Field of Classification Search ............ 248/309.1, 248/188.4, 188.2, 188.8, 674; 403/14, 24, 403/77; 342/70, 175
See application file for complete search history.

(56) References Cited

U.S. PATENT DOCUMENTS

| | | | | |
|---|---|---|---|---|
| 824,525 | A | * | 6/1906 | Bonney .................... 248/188.4 |
| 2,010,299 | A | * | 8/1935 | Gray ........................ 248/188.4 |
| 5,743,618 | A | | 4/1998 | Fujino et al. |
| 6,601,466 | B2 | * | 8/2003 | Koerber et al. ............ 74/89.13 |
| 6,742,750 | B2 | * | 6/2004 | Burr ........................ 248/188.4 |
| 6,910,666 | B2 | * | 6/2005 | Burr ........................ 248/188.4 |

FOREIGN PATENT DOCUMENTS

| | | |
|---|---|---|
| DE | 19642810 | 4/1998 |
| DE | 197 57 005 | 8/1998 |
| DE | 19739298 | 11/1998 |
| DE | 199 24 056 | 9/2000 |
| DE | 19922499 | 11/2000 |
| DE | 199 24 055 | 12/2000 |
| WO | WO 99/13525 | 3/1999 |
| WO | WO 00 73103 | 12/2000 |

* cited by examiner

*Primary Examiner*—Ramon O Ramirez
(74) *Attorney, Agent, or Firm*—Kenyon & Kenyon LLP

(57) ABSTRACT

A holding device for an adjustable housing, such as the housing of a radar sensor, which allows the position of the housing at a mounting location to be changed in at least one degree of freedom using least one adjusting screw. In this context, the at least one adjusting screw is held at the mounting location in a fixing dome so that it can be rotated and tilted, the respective fixing dome of plastic being capable of being snapped into a corresponding opening at the mounting location so that it is secured against rotation and pulling.

6 Claims, 7 Drawing Sheets

POSITIONING DEVICE FOR ADJUSTABLE HOUSING

FIELD OF THE INVENTION

The present invention relates to a holding device for an adjustable housing, e.g., for the housing of a radar sensor, where the housing may be mounted on the outside of a motor vehicle.

BACKGROUND INFORMATION

Such a radar sensor may be screwed to a vehicle on the outside with a holding device. This radar sensor may be, for example, a component of a proximity warning system or ranging system, which continuously processes information on the distance and/or the relative speed of the vehicle with respect to other vehicles and the road conditions. In this context, the radar sensor may be very accurately aligned with the longitudinal vehicle axis, as a result of which the sensor may be adjusted in horizontal and vertical directions upon installation into the vehicle, because of the sometimes considerable vehicle tolerances in the region of the mounting location.

German Patent Application 199 24 055, for example, refers to adjusting the radar sensor from above, below, or from the side upon installation, by manually turning two adjusting screws with the aid of corner gears. The difficulty is to find an installation space for the radar sensor which, on one hand, offers enough space and meets the high-frequency requirements and, on the other hand, allows simple and thus inexpensive adjustment of the radar sensor at the end of the manufacturing process.

In some adjusting devices, plastic-coated steel holders or plastic intermediate holders are used in combination with aluminum holders for the installation on the vehicle. The adjustment is then carried out in two axes using adjusting screws, the friction between the plastic domes and the screws being used as locking torques. Here, the radar sensor is fastened via so-called "ball sockets", allowing the sensor to be rotated and tilted.

Some systems described above require very complex and expensive tools, because, in each case, a punching and bending tool and a tool for coating the holding device with plastic are required. When using a plastic intermediate holder, an additional tool for a steel or aluminum holder is needed as well. Moreover, in some systems, the tools need to have a specific design for each vehicle to which the holding device is attached.

SUMMARY OF THE INVENTION

A holding device for an adjustable housing, where the position of the housing, for example, for a radar sensor, at a mounting location is intended to be changeable in at least one degree of freedom is developed in that the at least one adjusting screw is held in a fixing dome at the mounting location so that it may be rotated and tilted.

This may be accomplished in that the fixing dome is capable of being snapped into a corresponding opening at the mounting location so that it is secured against rotation and pulling. In this context, the fixing dome may also be mounted in an intermediate holding device between the housing and the mounting location.

The fixing dome may be provided with undercuts and radial overlaps, allowing the fixing dome to be nonrotatably fitted into the opening at the mounting location or to the intermediate holder. In this context, the fixing domes may be made of plastic.

For optimum adjustment in horizontal and vertical directions, the housing may be mounted at the mounting location or on the intermediate holder using three adjusting screws, which, in an exemplary embodiment, are held on the housing in blind rivets into which the adjusting screws may be driven with their threads in a self-locking manner. Thus, the holding torque required for the screws may be easily accomplished because the blind rivets are self-locking or self-securing to a sufficient degree to prevent maladjustment.

In an exemplary embodiment, the housing forms part of a radar sensor which is adjustably mounted on a component of a motor vehicle on the outside.

The holding device according to an exemplary embodiment of the present invention has the advantage that it is possible to use plastic domes which are easy to manufacture and which may be directly attached, for example, to the front end of a motor vehicle or to an intermediate holder having a relatively simple design. The plastic domes may be latched and secured at the mounting location with a geometry that is easy to form, providing a rotatable support including the tilting of the adjusting screws which, in some holding devices, could only be achieved by an expensive ball socket.

Thus, the holding device according to an exemplary embodiment of the present invention is relatively inexpensive to implement and may be easily adapted to the specific mounting situation in a flexible manner.

DETAILED DESCRIPTION

Figure 1:
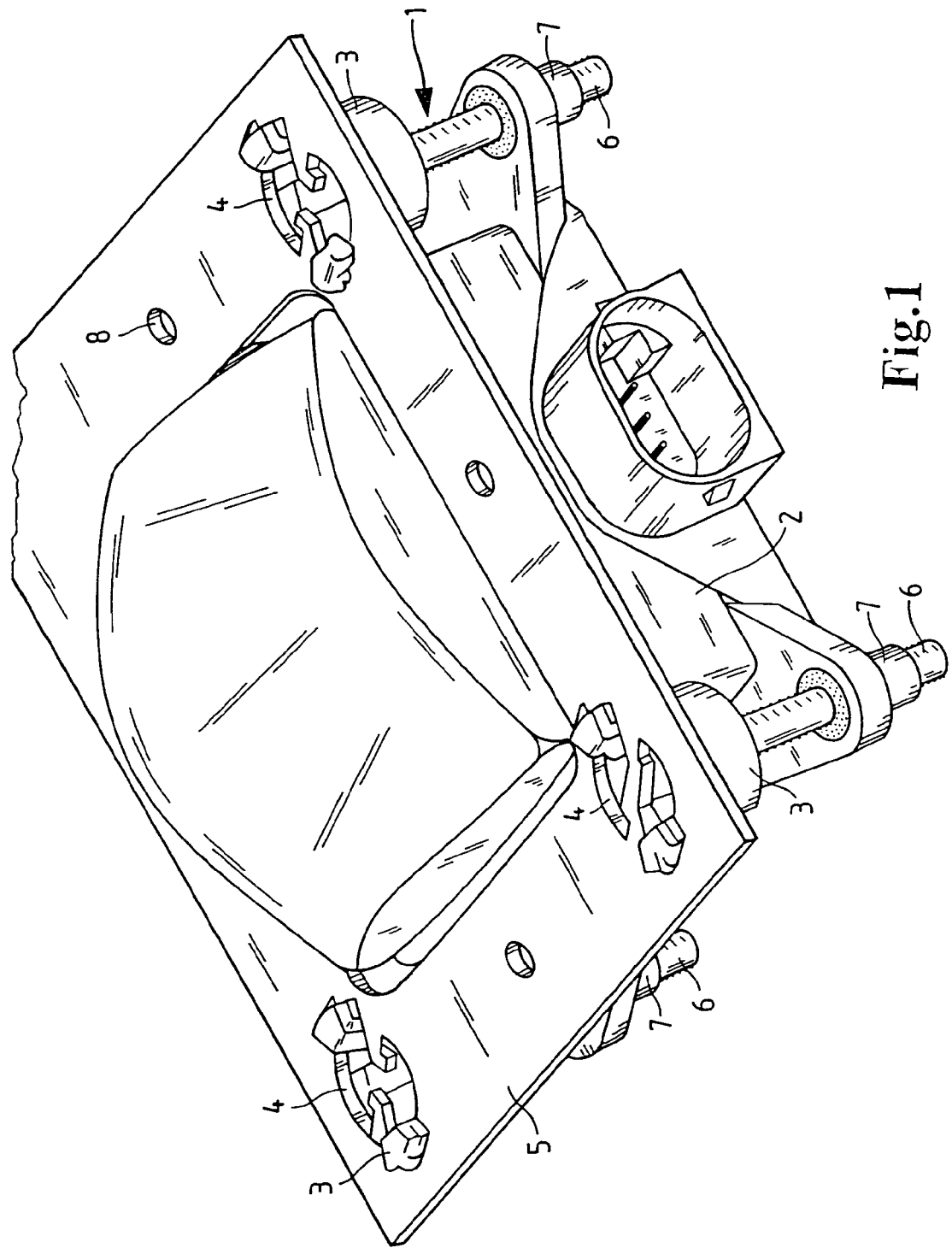
FIG. 1 shows a view of a radar sensor, including an exemplary embodiment of an adjustable holding device for attachment at a mounting location.

FIG. 1 shows a perspective view of a holding device 1 for a distance sensor 2 which is designed as a radar sensor. For attachment at a suitable mounting location on a motor vehicle, distance sensor 2 is adjustably attached, for example, to the front bumper by holding device 1.

Here, three plastic domes 3 are provided as connecting elements of holding device 1, the plastic domes being clipped into the corresponding openings 4 at the mounting location of the component of the motor vehicle or, as shown here, at an intermediate holder 5. Adjusting screws 6, which are provided with a ball head, are pressed into plastic domes 3. Adjusting screws 6 are mechanically connected to the housing of sensor 2 via blind rivets 7, adjusting screws 6 being secured in the respective blind rivet 7 by the self-locking action of the thread.

To adjust sensor 2 at the mounting location using holding device 1, a rotation of adjusting screws 6 and, thereby, a suitable horizontal and vertical change in position of sensor 2 may be accomplished using a suitable tool, for example, an electric screwdriver which may be held at bores 8.

Figure 2:
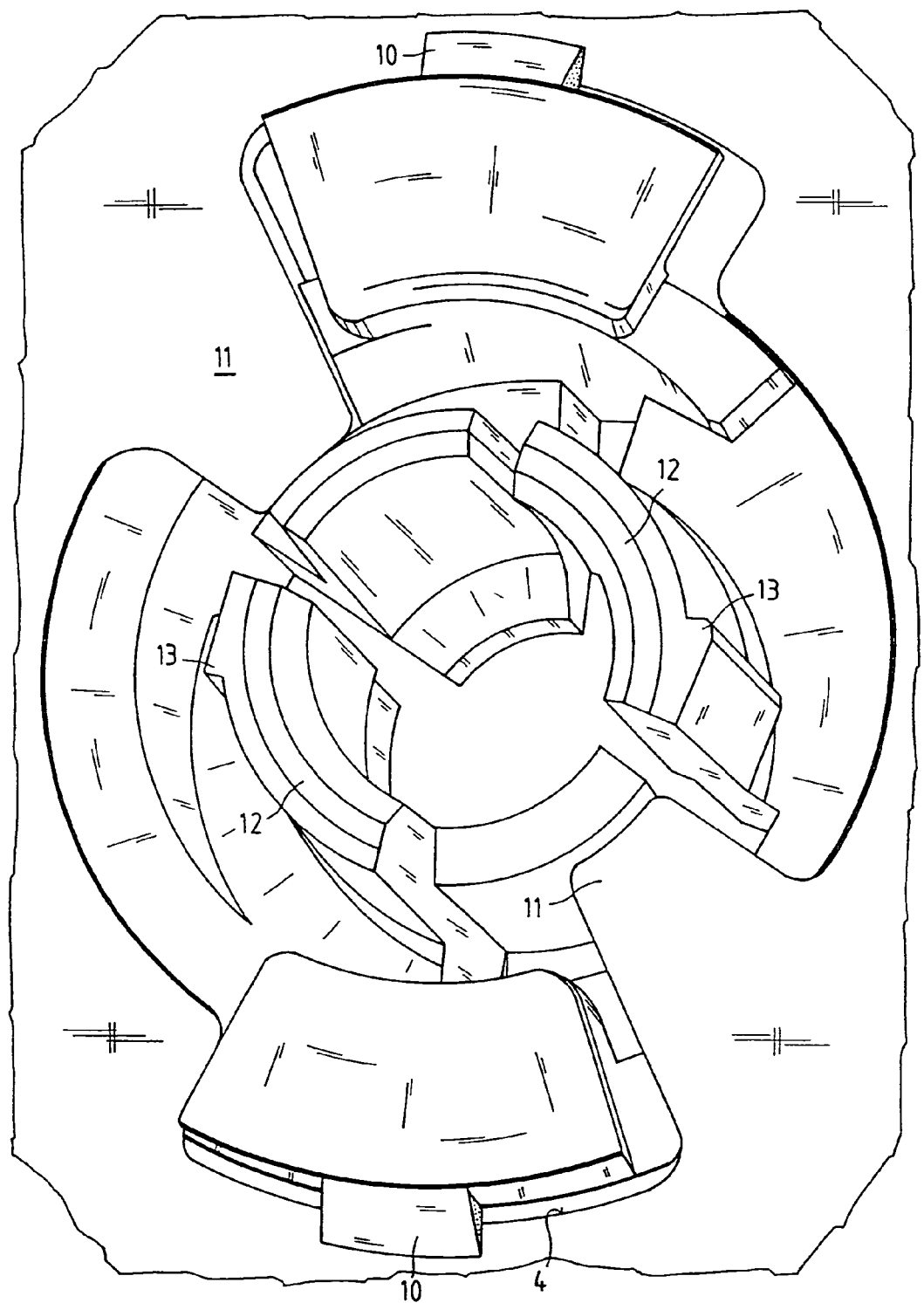
FIG. 2 shows an exemplary embodiment of a plastic dome for receiving adjusting screws for attachment at the mounting location in a detail view in a position prior to installation.

FIG. 2 shows a first exemplary embodiment of a secure connection of plastic domes 3 to intermediate holder 5. After clipping plastic domes 3 into the openings 4, overlaps 10, after rotation, may ensure a secure hold perpendicular to intermediate holder 5 in conjunction with suitable geometries 11 of opening 4. In the direction of rotation, spring elements 12 and undercuts 13 ensure a secure hold, thus preventing maladjustment.

Figure 3:
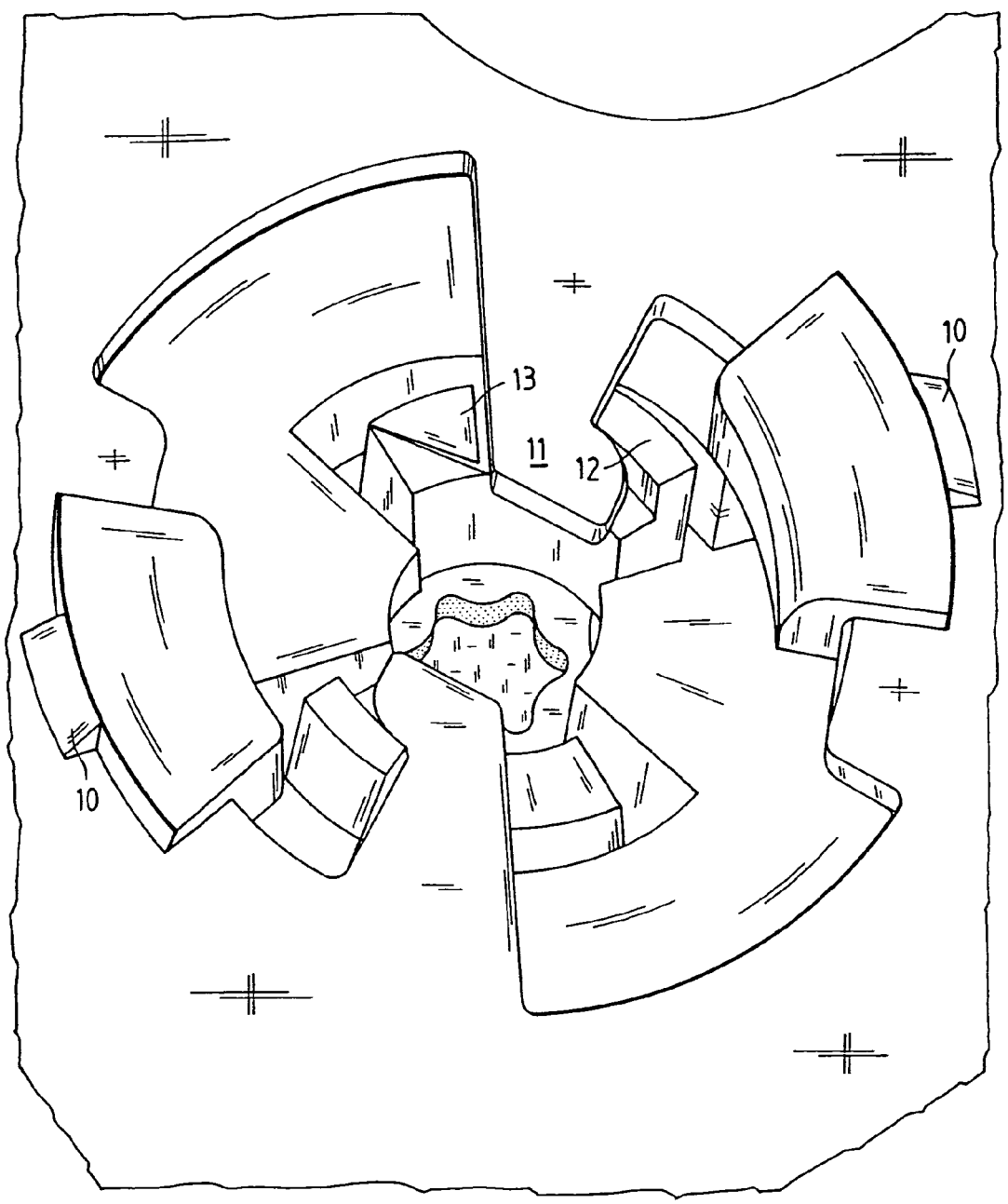
FIG. 3 shows another exemplary embodiment of a plastic dome for receiving adjusting screws for attachment at the mounting location in a detail view in the final installation position.
Figure 4:
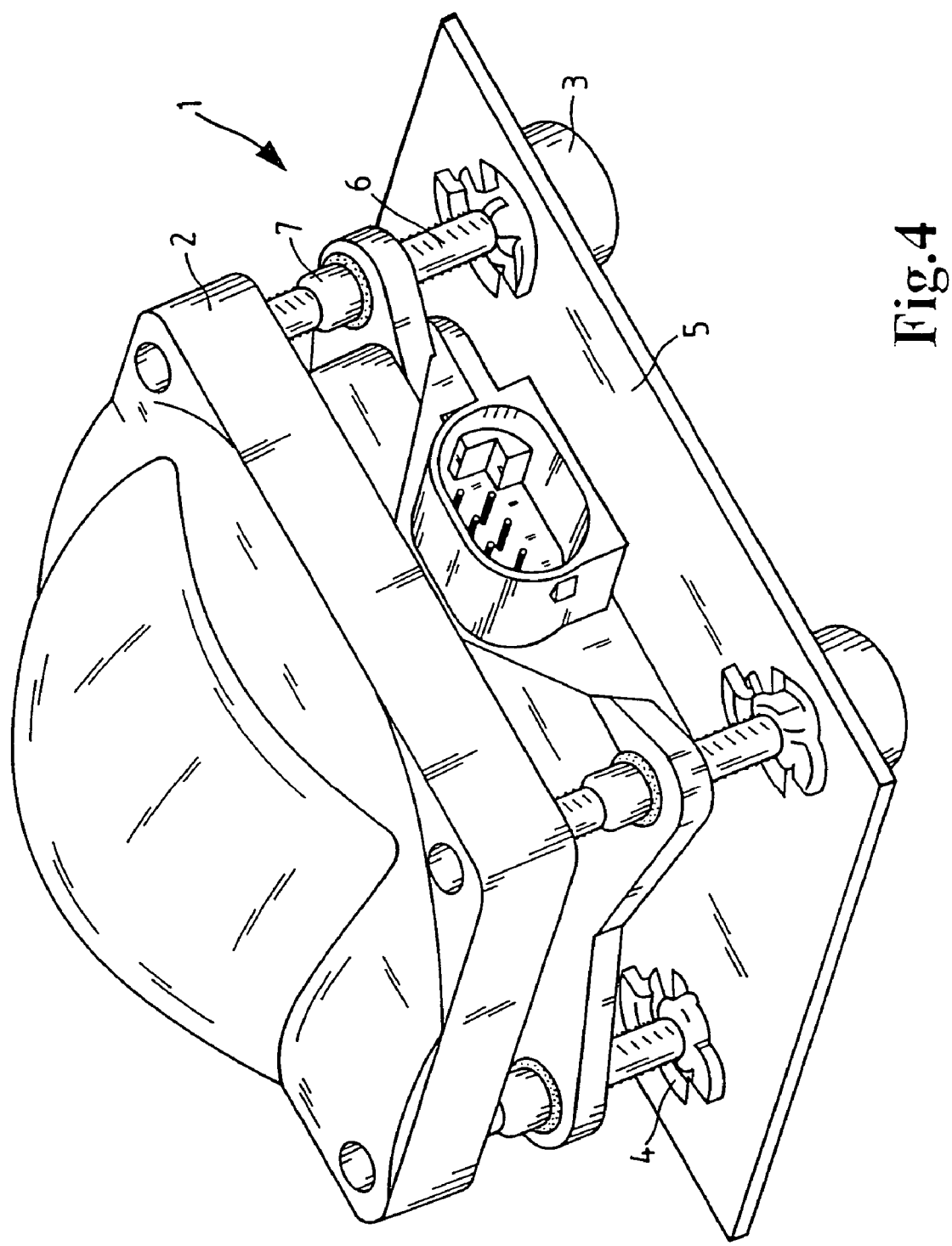
FIG. 4 shows a radar sensor and an exemplary embodiment of an adjustable holding device behind the radar sensor.
Figure 5:
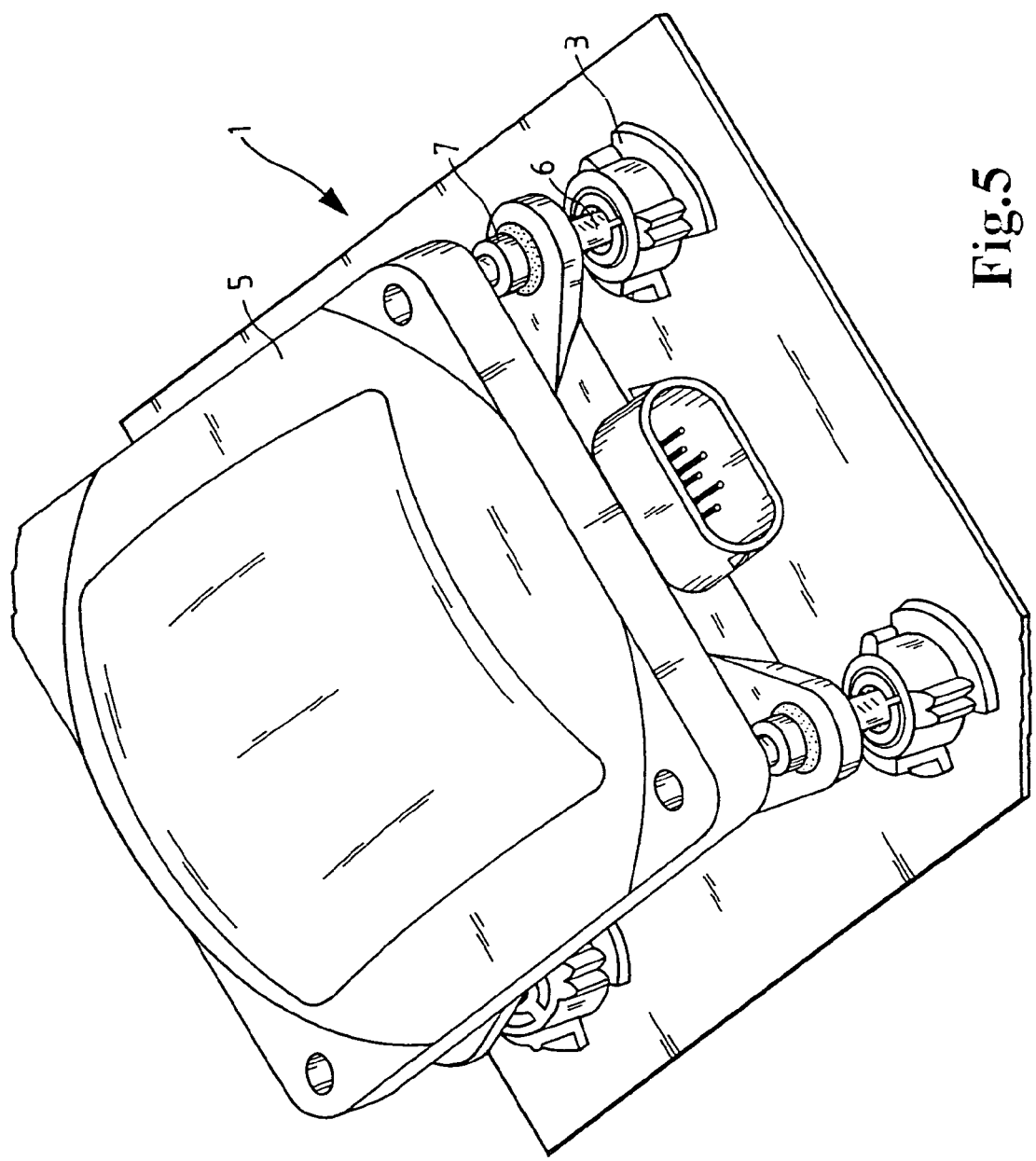
FIG. 5 shows an exemplary embodiment of a plastic dome, which is modified compared to the exemplary embodiment of FIG. 4.

FIG. 3 depicts another exemplary embodiment of spring elements 12 and of undercut 13 which is geometrically modified but acts in the same manner as in FIG. 2. In FIG. 4, intermediate holder 5 is arranged behind sensor housing 2 and provided with suitably adapted plastic domes 3. An arrangement of this kind is also shown in FIG. 5, which shows the rear side of plastic domes 3 which were described with reference to FIG. 2.

Figure 6:
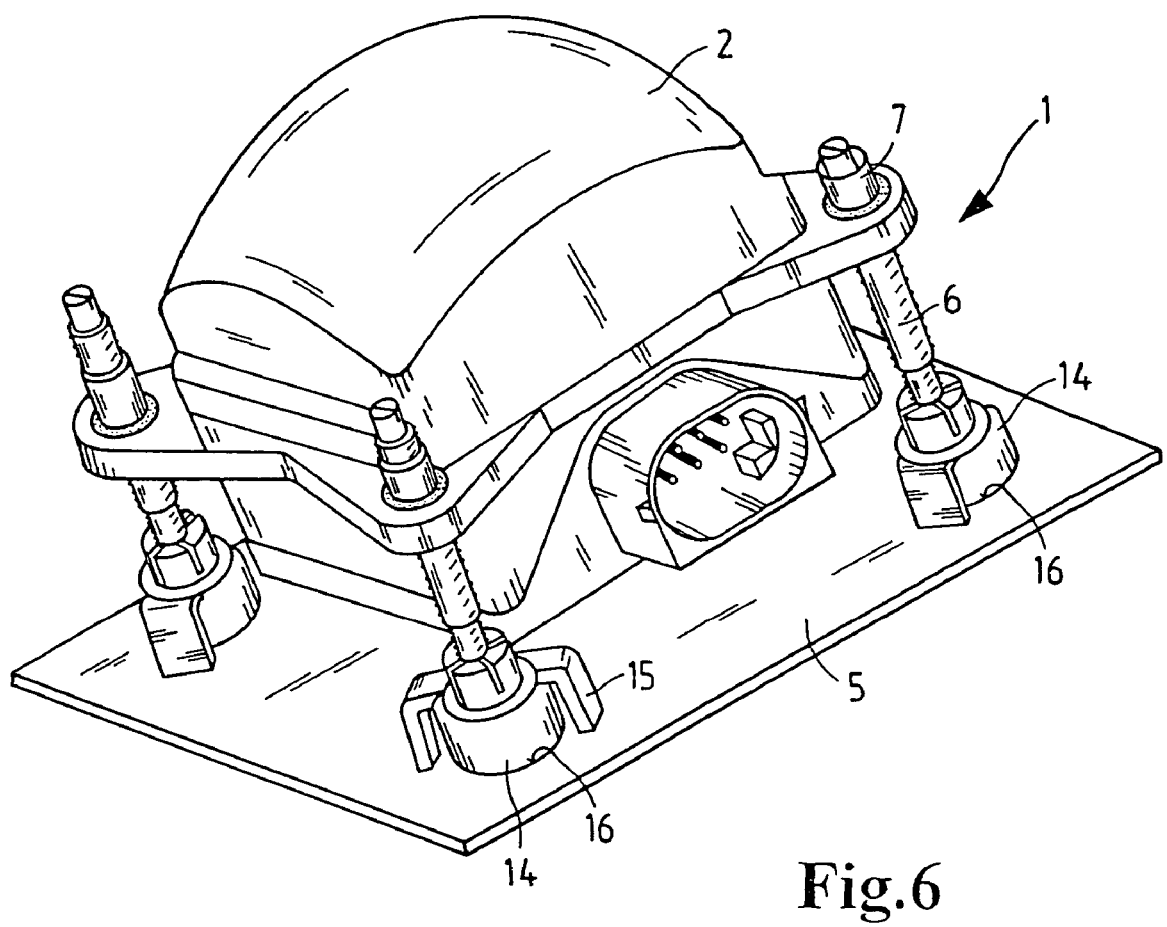
FIG. 6 shows another exemplary embodiment of a plastic dome, which is modified compared to the exemplary embodiment of FIG. 4.
Figure 7:
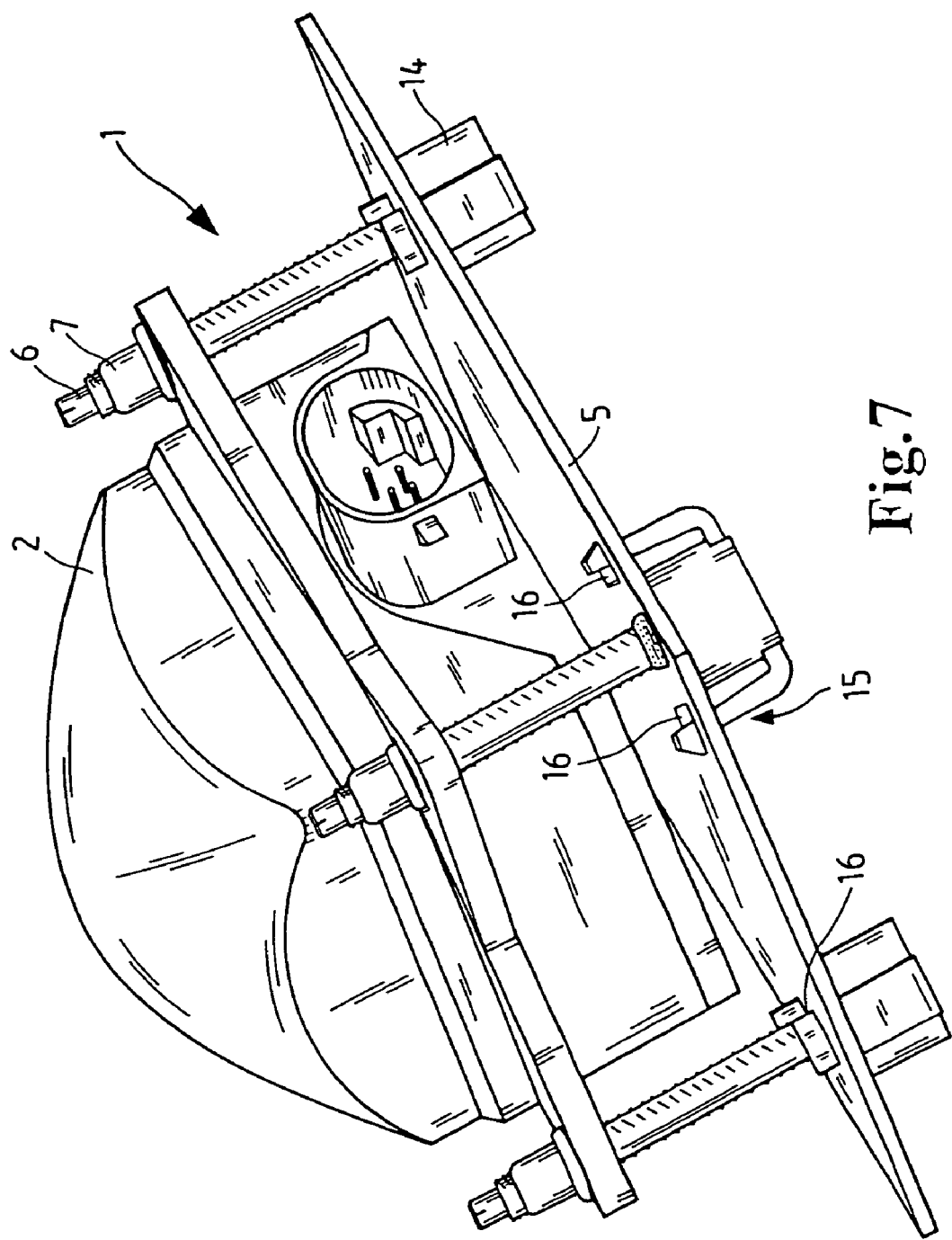
FIG. 7 shows another exemplary embodiment of a plastic dome, which is modified with respect to the exemplary embodiment of FIG. 4 and which is not secured against rotation.

In FIG. 6 and FIG. 7, other exemplary embodiments of plastic domes 14 having a simple clip mechanism 15 are shown in slightly different views and modifications. In FIG. 6, the clip mechanism is clipped into corresponding openings 16 from the side of sensor 2, so that here a secure hold in the axial direction of adjusting screws 6 is provided but no locking in the direction of rotation. In the exemplary embodiment according to FIG. 7, clip mechanism 15 is attached to intermediate holding device 5 from the side opposite sensor 2.

What is claimed is:

1. A holding device for an adjustable housing, comprising:
   at least one fixing dome positioned at at least one mounting location of the adjustable housing; and
   at least one adjusting screw held in the at least one fixing dome, the at least one adjusting screw being rotatable and tiltable;
   wherein a position of the adjustable housing at one of the at least one mounting location is changeable within at least one degree of freedom using at least one of the at least one adjusting screws which hold the adjustable housing at the at least one mounting location,
   wherein the at least one fixing dome is snappable into an opening at the at least one mounting location to secure it against rotation and pulling, and
   wherein the at least one fixing dome is mounted in an intermediate holder between the adjustable housing and the at least one mounting location.

2. The holding device of claim 1, further comprising:
   undercuts and radial overlaps to allow the at least one fixing dome to be securely and nonrotatably fitted into the opening at one of the at least one mounting location and the intermediate holder.

3. The holding device of claim 1, wherein the at least one fixing dome includes at least one plastic dome.

4. The holding device of claim 1, wherein the adjustable housing is mountable using three adjusting screws at one of the at least one mounting location and the intermediate holder.

5. The holding device of claim 1, wherein the housing forms part of a radar sensor which is adjustably mounted on a component of a motor vehicle on its outside.

6. A holding device for an adjustable housing, comprising:
   at least one fixing dome positioned at at least one mounting location of the adjustable housing; and
   at least one adjusting screw held in the at least one fixing dome, the at least one adjusting screw being rotatable and tiltable; and
   blind rivets disposed in the adjustable housing to hold the adjusting screws on the housing, the adjusting screws being driven into the blind rivets with their threads in a self-locking action,
   wherein a position of the adjustable housing at one of the at least one mounting location is changeable within at least one degree of freedom using at least one of the at least one adjusting screws which hold the adjustable housing at the at least one mounting location.

* * * * *